United States Patent [19]

Kassai

[11] Patent Number: 4,545,599
[45] Date of Patent: Oct. 8, 1985

[54] CONNECTING STRUCTURE BETWEEN PUSH RODS AND PUSH ROD-CONNECTING ROD IN BABY CARRIAGE

[75] Inventor: Kenzou Kassai, Osaka, Japan

[73] Assignee: Kassai Kabushikikaisha, Osaka, Japan

[21] Appl. No.: 486,344

[22] Filed: Apr. 19, 1983

[30] Foreign Application Priority Data

May 19, 1982 [JP] Japan ................................ 57-85493

[51] Int. Cl.$^4$ ............................................. B62B 7/06
[52] U.S. Cl. .................................. 280/642; 280/650; 403/92
[58] Field of Search ..................... 280/47.36, 47.37 R, 280/650, 47.38, 47.4, 642, 644, 647, 649, 657, 658, 42, 646; 403/92, 93, 94, 96; 297/42; 108/115

[56] References Cited

U.S. PATENT DOCUMENTS

| | | | |
|---|---|---|---|
| 4,030,769 | 6/1977 | Peng et al. | 280/42 |
| 4,049,292 | 9/1977 | Perego | 280/650 |
| 4,216,974 | 8/1980 | Kassai | 280/42 |

Primary Examiner—Joseph F. Peters, Jr.
Assistant Examiner—Mark C. Dukes
Attorney, Agent, or Firm—W. G. Fasse; D. H. Kane, Jr.

[57] ABSTRACT

A connecting structure for a baby carriage disposed between a pair of push rods (1) and a push rod-connecting member (7) has a pair of brackets (16) extending inwardly from the push rods (1), a pair of turning shafts (17) provided on the brackets (16), a pair of sockets (18) supported by the turning shafts (17) for a folding movement of the sockets relative to the brackets (16). Each socket (18) receives one end of the push rod-connecting member (7) so that the member (7) can be rotated, around its longitudinal axis. A pair of engaging sections (19) is fixed on the push rods (1) at positions opposed to the lateral surfaces of the ends of the push rod-connecting member (7). A pair of lock control sections (20) is secured to the ends of the push rod-connecting member (7) for cooperation with the respective engaging section. For this purpose each locking section has an abutting portion (22) of relatively large radius and a clearing portion (23) of relatively small radius. By rotating the push rod-connecting member (7) around its longitudinal axis, the locked and unlocked states can be selceted, whereby in the locked state the abutting portion (22) is locked against the respective engaging section, while in the unlocked state the clearing portion (22) clears the respective engaging section for permitting folding the push rod-connecting member.

9 Claims, 9 Drawing Figures

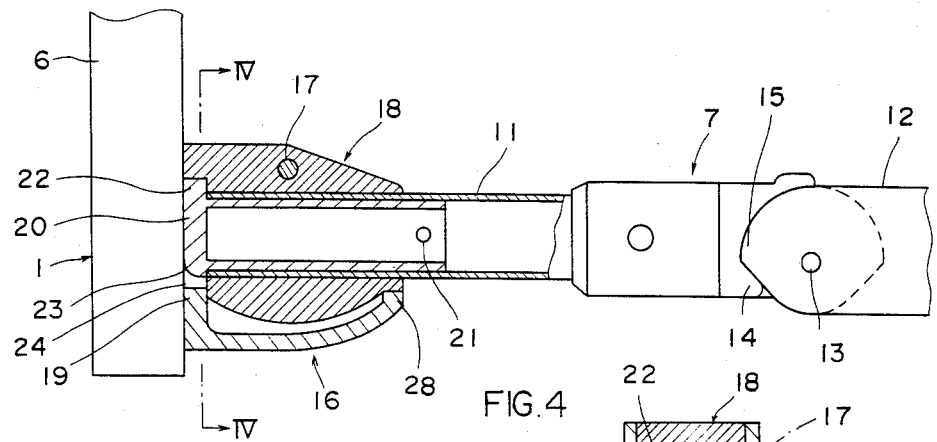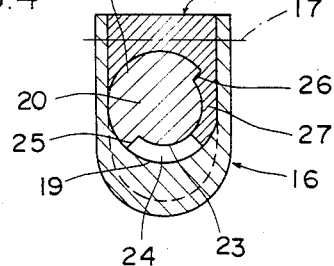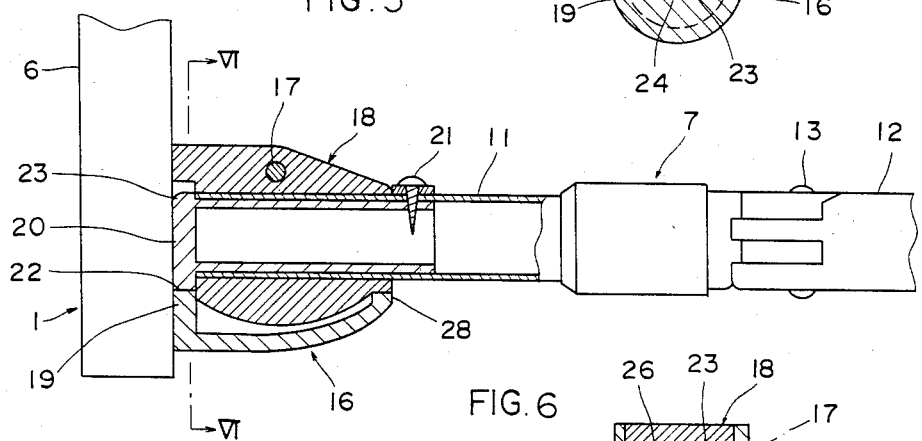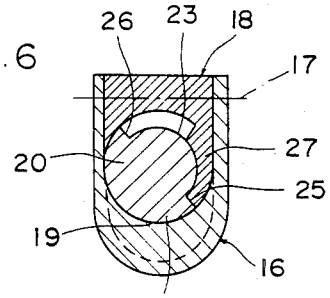

CONNECTING STRUCTURE BETWEEN PUSH RODS AND PUSH ROD-CONNECTING ROD IN BABY CARRIAGE

BACKGROUND OF THE INVENTION

1. Field of the Invention

This invention relates to a connecting structure between a pair of push rods and to a push rod-connecting member connected between said push rods in a baby carriage. More particularly the invention relates to a connecting structure for a collapsible baby carriage, constructed so that when the spacing between the two push rods is widened or narrowed as the baby carriage is opened or closed, the widened spacing of the push rods is locked at the connections of the push rods to a push rod-connecting member.

2. Description of the Prior Art

There have been proposed various types of folding features for collapsible baby carriage. A typical conventional baby carriage has at least one push rod for pushing and steering the baby carriage, and in most cases a pair of such push rods is provided on opposite sides of the carriage and interconnected by a push rod-connecting member extending in the direction of the width of the carriage. When attention is paid to the folding action of baby carriages, it is seen that a collapsible baby carriage has a pair of push rods constructed so that they are maintained at a predetermined spacing when the baby carriage is opened and when the latter is closed their spacing is narrowed. In this case, the push rod-connecting member is foldable at least in one place in its middle region, whereby the folding operation allows the change of the spacing of the push rods in the opened and closed states of the baby carriage.

In order to firmly hold the opened state of the baby carriage, it is necessary to prevent the push rod-connecting member from folding in this opened state. Hence, it is necessary that in the opened state of the baby carriage, the connecting member is locked for resisting any action in the direction of folding the push rod-connecting member.

SUMMARY OF THE INVENTION

Accordingly, a principal object of this invention is to provide a connecting member or structures between push rods of a baby carriage, wherein the locking against folding of the push rod-connecting member is attained at the connections between the push rods and the push rod-connecting member.

In brief, according to the invention, there is provided a pair of brackets extending inwardly from the push rods, and a turning shaft is provided in each bracket. By means of the turning shaft, a socket is turnably held with respect to the bracket. The sockets receive the ends of the push rod-connecting member so that the push rod-connecting member can be turned around its axis. An engaging section is fixedly provided on each push rod at a position opposed to the lateral surface of each end of the push rod-connecting member. In connection with said engaging section, a lock control section is fixedly provided at each end of the push rod-connecting member. Each lock control section has an abutting portion of a relatively large radius and a clearing portion of a relatively small radius. In such an arrangement, where the lock control sections are turned by the turning of the push rod-connecting member around its axis, when the abutting portions are brought to a position where they are opposed to the engaging sections, there is established a state where said abutting portions and said engaging sections abut against each other, thereby locking the push rod-connecting member against turning around the axes of the turning shafts, so that the push rod-connecting member resists any action in the direction to fold it. However, when the clearing portions are brought to a position where they are opposed to the engaging sections, there is established a state where said clearing portions and said engaging sections do not engage each other, thus allowing the push rod-connecting member to be turned around the axes of the turning shafts.

According to this invention, by simply turning the push rod-connecting member around its axis, application and cancellation of the locking to resist bending of the push rod-connecting member can be effected by a simple operation. Moreover, since the push rod-connecting member is located within easy reach of the person who pushes the baby carriage, the connecting member can be easily and conveniently performed. Further, if the locking against folding of the push rod-connecting member is effective, the mechanical components including the push rods and the push rod-connecting member are made rigid, so that there is no possibility that these components can be deformed under a force pushing the baby carriage and hence said force is effective for steering and pushing of the baby carriage without any problem. Further, any trouble which would cause the baby carriage to accidentally change from the closed to the opened state is also avoided.

Other objects and features of the invention will become more apparent from the following detailed description with reference to the drawings.

BRIEF DESCRIPTION OF THE DRAWINGS

FIG. 3 is a plan view, partly in section, of the principal portion of said embodiment, showing the unlocked state;

FIG. 4 is a sectional view taken along the line IV—IV in FIG. 3;

FIG. 5 is a view similar to FIG. 3, but showing the locked state;

FIG. 6 is a sectional view taken along the line VI—VI in FIG. 5;

DESCRIPTION OF THE PREFERRED EMBODIMENTS AND OF THE BEST MODE OF THE INVENTION

Figure 1:
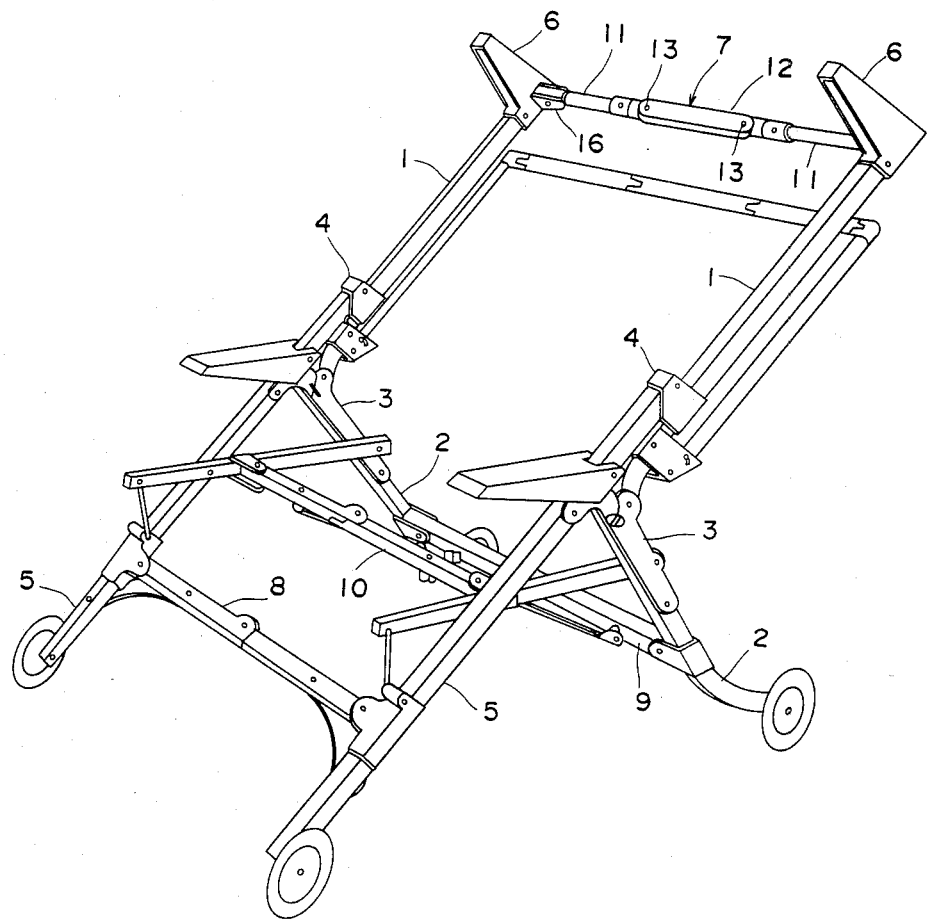
FIG. 1 is a perspective view of a baby carriage in the opened state according to an embodiment of the invention.

In the baby carriage shown in FIG. 1, a pair of push rods 1 is attached to rear legs 2 through angle bars 3. The push rods 1 have sliders 4 slidably attached thereto, said sliders 4 holding front legs 5. Each push rod 1 has a grip 6 attached to its upper end. A push rod-connecting member 7 connected between the push rods 1 is attached to both push rods 1 at the position of the grips 6. The push rod-connecting member 7 extends in the direction of the width of the baby carriage. Other members which extend widthwise include a front leg connecting rod 8, a rear leg connecting rod 9 and a central connecting rod 10. These widthwise extending members, such as the push rod-connecting member 7, the front leg connecting rod 8, the rear leg connecting rod 9 and the central connecting rod 10 assume a linear state when the baby carriage is in the opened state, as shown in FIG. 1, but when the baby carriage is in the closed state, they are folded in their respective directions. Therefore, the pair of push rods 1, the pair of front legs 5 and the pair of rear legs 2 have their respective spacings from each other narrowed when the baby carriage assumes the folded state.

Figure 2:
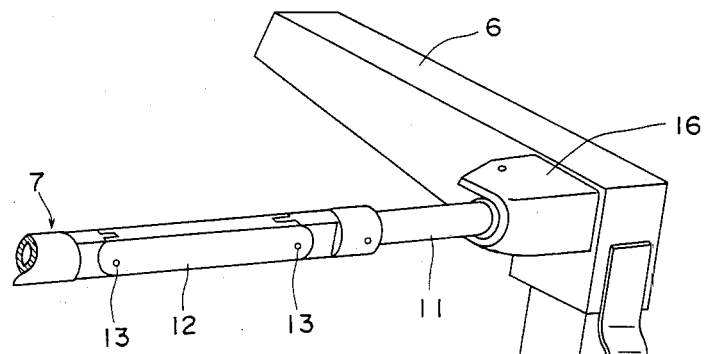
FIG. 2 is a perspective view of the principal portion of said embodiment, looking at the back of the upper end of the push rods and the connecting member of the baby carriage.

As shown in FIG. 2, this invention is directed to the connecting means between the push rods 1 and both ends of the push rod-connecting member 7. In addition, the state shown in FIGS. 1 and 2 is one in which the push rod-connecting member 7 is locked against folding.

The push rod-connecting member 7, when viewed in the direction of the length thereof, comprises three parts, namely, opposite end portions 11,11 and an intermediate portion 12. The opposite end portions 11 and the intermediate portion 12 are connected together by folding connecting pins 13 so that they are turnable, i.e., foldable, relative to each other. In connection with this folding, the arrangement around the folding connecting pin 13 may be so selected as to allow the push rod-connecting member 7 to be folded only in the direction shown in FIG. 7. In this embodiment, sections 14 of the opposite end portions 11 abut against sections 15 of the middle portion 12 (FIG. 3), whereby the push rod-connecting member 7 can be folded only in one direction.

In order to attach such push rod-connecting member 7 to the pair of push rods 1, there is provided a bracket 16 inwardly extending from each push rod 1. A turning shaft 17 is positioned in the bracket 16. An approximately cylindrical socket 18 is held by the turning shaft 17. Each end of the push rod-connecting member 7 is received in a respective socket 18 so that the push rod-connecting member 7 is turnable around its longitudinal axis. The results of turning of the push member-connecting rod 7 around its longitudinal axis are shown in FIGS. 3 and 4 showing the unlocked, foldable state and FIGS. 5 and 6 showing the locked, non-foldable state.

An engaging section 19 is provided in a position on each push rod 1 where it is opposed to the lateral surface of each end of the push rod-connecting member 7. In this embodiment, the engaging section 19 is integral with the bracket 16, but a separate member may be added as the engaging section. Associated with the engaging section 19 is a lock control section 20 fixed to each end of the push rod-connecting member 7. In this embodiment, the lock control sections 20 are formed on the ends of pipes inserted in the pipe forming the opposed end portions 11, and the first-mentioned pipes are fixed to the second-mentioned pipe by screws 21, whereby the lock control sections 20 are fixedly secured on the ends of the push rod-connecting member 7. Each lock control section 20 has an abutting portion 22 with a relatively large radius and a clearing portion 23 with a relatively small radius. In this embodiment, the abutting portion 22 and the clearing portion 23 each extend along a half circumference, as best shown in FIGS. 4 and 6, but this is not absolutely necessary, as can be seen from a description of the function of these portions to be given below, it being only necessary that at least a portion of the lock control section 20 functions as the abutting portion 22 and that at least another portion functions as the clearing portion 23. The degree of radial projection of the abutting portion 22 and the degree of radial projection of the clearing portion 23 are selected in the manner described below.

As for the abutting portion 22, as shown in FIGS. 5 and 6, it is so selected that when the abutting portion 22 is brought into a position opposed to the engaging section 19, the abutting portion 22 and the engaging section 19 abut against each other. As for the clearing portion 23, as shown in FIGS. 3 and 4, when the clearing portion 23 is brought into a position opposed to the engaging section 19, there is a clearance 24 defined between the clearing portion 23 and the engaging portion 19, thus allowing the socket 18 to be brought into the state shown in FIG. 7 without any obstacle.

The lock control sections 20 in this ebodiment are preferably arranged to also perform another function to be presently described. As best shown in FIGS. 4 and 6, the lock control section 20 has a pair of rising walls 25 and 26 at the boundary between the abutting portion 22 and the clearing portion 23. The socket 18 has a projecting portion 27 positioned between said rising walls 25 and 26. In this case, as shown, the rising walls 25 and 26 are spaced 180 degrees apart, while the projecting portion 27 extends through an angle of 90 degrees, so that the lock control section 20 can be turned through 90 degrees around its longitudinal axis relative to the socket 18. Therefore, it follows that the push rod-connecting member 7 can also be turned through 90 degrees relative to the sockets 18. If the angular range between the rising walls 25 and 26 and/or the angular range in which the projecting portion extends is changed, the range of the turning of the push rod-connecting member 7 around its longitudinal axis can be changed as desired.

In addition, such turning range limiting means for the push rod-connecting member 7 may be replaced by other limiting means. For example, if a pin is set in either the socket 18 or the push rod-connecting member 7 and an elongated circumferentially extending opening is provided for receiving said pin in the other, then a similar turning range limiting means is obtained. Further, such turning range limiting means may be provided only on one end of the push rod-connecting member 7 rather than on both ends thereof. Such turning range limiting means may not be provided at all, for the turning of the push rod-connecting member can be stopped within a predetermined turning range by the operator if he is conscious of it. Therefore, in order to make it easier to limit the turning to the predetermined turning range, suitable marks or scale marks may be provided.

In this embodiment, the bracket 16 is U-shaped in cross-section, as best shown in FIGS. 4 and 6 whereby the bracket 16 also serves as a cover for the socket 18. The function of the bracket 16 as a cover has the merit of preventing injuries, such as a finger pinched in the connection between the push rod 1 and the push rod-connecting member 7. The bracket 16 has an edge 28 capable of abutting against the socket 18. This edge 28 locks the socket 18 against turning clockwise from the state shown in FIG. 3 around the axis of the turning shaft 17, while allowing turning only in the direction shown in FIG. 7. When this is taken into account, it is seen that the arrangement for allowing the folding around the axis of the aforesaid folding connecting pin 13 in one direction alone is not absolutely necessary. Reversely, if the folding around the axis of the folding connecting pin 13 is limited to one direction only, the edge 28 on the bracket 16 may not be necessary.

The operation and function of the invention will now be described in connection with the locking and unlocking mechanisms.

First, the locked state shown in FIGS. 5 and 6 will be described. This locked state corresponds to the state also shown in FIGS. 1 and 2. In this locked state, the abutting portion 22 abuts against the engaging section 19, inhibiting the socket 18 from turning around the axis of the turning shaft 17, because the shaft 17 extends, in space, at a right angle to the folding pin 13. If the push rod-connecting member 7 is turned around its longitudinal axis from this state through, e.g., 90 degrees, the unlocked state shown in FIGS. 3 and 4 is obtained.

The unlocked state is such that the clearing portion 23 faces the engaging section 19, with a clearance 24 defined therebetween. Further, the folding connecting pin 13 and the turning shaft 17 now extend in parallel to each other. Therefore, in this unlocked state, the socket 18 is allowed to turn around the axis of the turning shaft 17 and the opposed end portions 11 and the central portion 12 of the push rod-connecting member 7 are allowed to fold around the axes of the folding connecting pins 13. In this condition, the baby carriage may now be folded.

During the folding between the baby carriage, the spacing of the push rods 1 is narrowed. In response thereto, the following takes place. The sockets 18 turn around the axes of the turning shafts 17 and the end portions 11 as well as the central portion 12 fold around the axes of the folding connecting pins 13, whereby the state shown in FIG. 7 is established.

Figure 7:
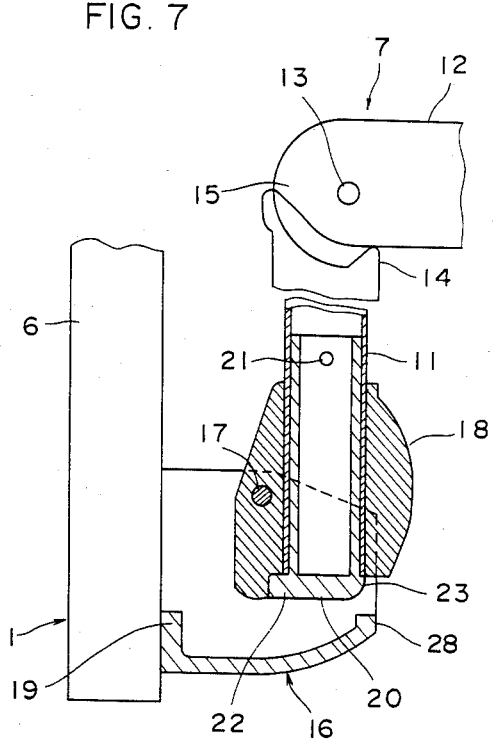
FIG. 7 is a view corresponding to FIG. 3, showing the folded state of a push rod-connecting member.

The closed state of the baby carriage shown in FIG. 7 is changed to the opened state, by an operation proceeding in order of FIGS. 7, 3 and 5, which operation is the reverse to that described above. Thus an explanation thereof is omitted.

Figure 8:
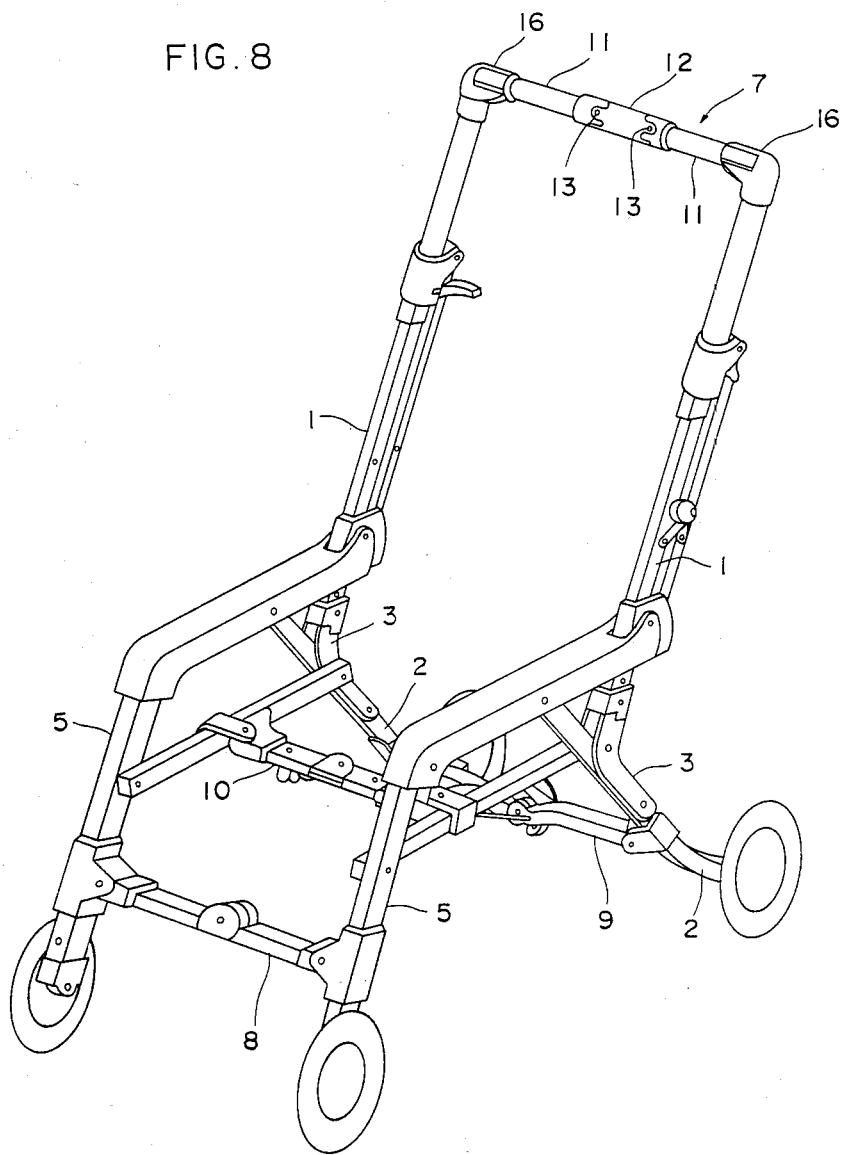
FIG. 8 is a perspective view of a baby carriage in the opened state according to another embodiment of the invention.
Figure 9:
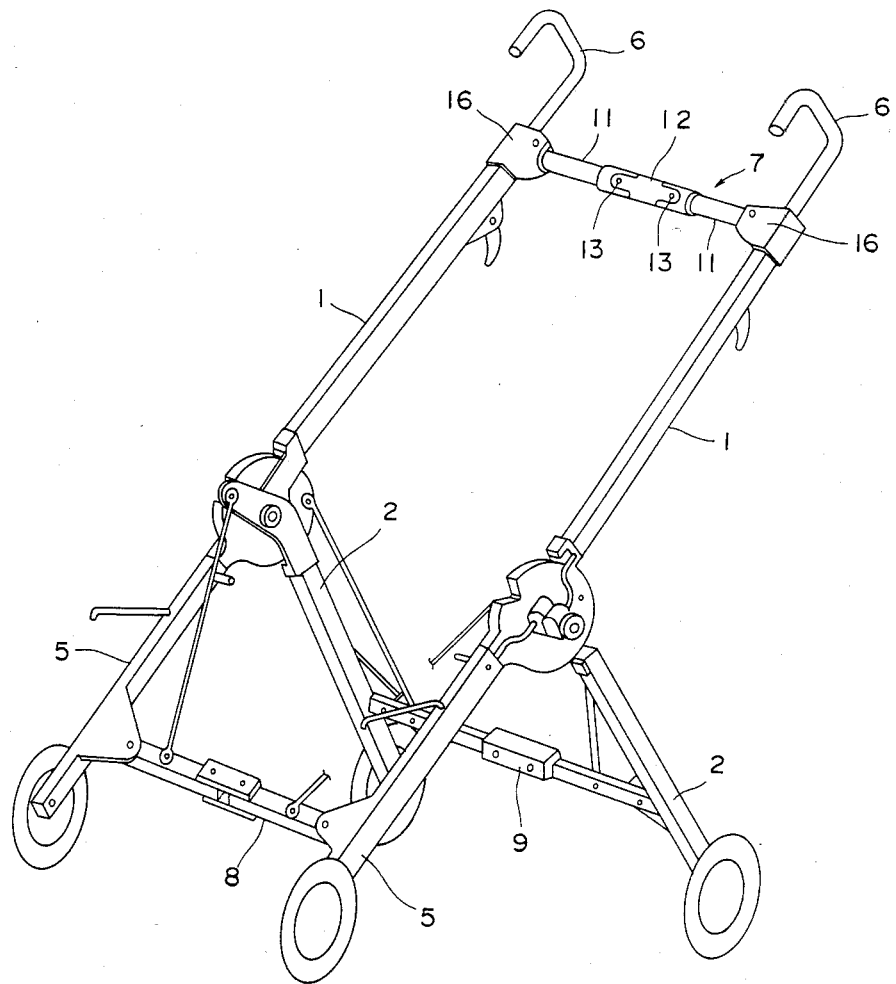
FIG. 9 is a perspective view of a baby carriage in the opened state according to a further embodiment of the invention.

The baby carriages shown in these figures are the same as the baby carriage shown in FIG. 1 as far as the movement of the pair of push rods 1 during the folding operation is concerned. That is, the spacing of the push rods 1 is maintained in the opened state of the baby carriage and is narrowed in the closed state of the baby carriage. The push rod-connecting member 7 is connected between the push rods 1 of the baby carriage and is foldable at its middle portion. In addition, the push rod-connecting member 7 of the baby carriage shown in FIG. 8 is folded forwardly so that the central portion 12 is displaced forwardly, as in the baby carriage of FIG. 1. Therefore, the state shown in FIG. 8 is one in which the push rod-connecting member 7 is locked to resist folding. The direction in which the push rod-connecting member 7 is folded when the baby carriage shown in FIG. 9 is folded is such that the central portion 12 is displaced forwardly. Therefore, the state shown in FIG. 9 is one in which the push rod-connecting member 7 is unlocked to allow folding. As for the other arrangements, where the baby carriage shown in FIGS. 8 and 9 have components which are the same as or similar to those of the baby carriage shown in FIG. 1, like parts have the same reference numerals, and a description thereof is omitted as the corresponding description given with reference to FIG. 1 applies.

As is apparent from a comparison of the baby carriages shown in FIG. 1 and 8 with the one shown in FIG. 9, the folding direction of the push rod-connecting rod 7 is necessarily changed according to the type of the baby carriage. The connecting structure of this invention is applicable irrespective of the folding direction. Thus, though not illustrated, it is applicable where the push rod-connecting rod is folded downwardly or rearwardly.

Further, the push rod-connecting member 7 has been constructed so that it can be folded at two places by two folding connecting pins 13; however, at least one such foldable portion is sufficient. This arrangement is also changed according to the type of the baby carriage.

Further, as best shown in FIG. 5, the connecting structure has been so constructed that in the locked state, the axis of the turning shaft 17 crosses at right angles a line parallel to the axis of the bending connecting pin 13. This arrangement has the merit that the linear state of the push rod-connecting member 7 in the locked state can be more firmly maintained; however, if such a merit is not desired, the respective directions of the turning shaft 17 and folding connecting pin 13 can be optionally selected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A connecting structure for a baby carriage disposed between two push rods (1) for maintaining said push rods at a predetermined spacing when the baby carriage is opened and for narrowing said spacing when the baby carriage is closed, comprising a push rod-connecting member (7) connected between said push rods (1), said push rod-connecting member being foldable at least in one place in its central portion whereby a folding and unfolding action changes said spacing between said push rods (1), a pair of brackets (16) extending inwardly from said push rods (1), a pair of turning shafts (17) provided on said brackets (16), a pair of sockets (18) held by said turning shafts (17) for tilting said sockets relative to said brackets (16), said push rod-connecting member (7) having ends received in said sockets for permitting a rotating movement of said push rod-connecting member around the longitudinal axis of said push rod-connecting member (7), a pair of engaging sections (19) rigidly secured to said push rods (1) at positions opposed to the lateral surfaces of the ends of said push rod-connecting member (7), and a pair of lock control sections (20) secured to the ends of said push rod-connecting member (7) for rotation with said push rod-connecting member (7), each of said lock control sections having an abutting portion (22) of relatively large radius and a clearing portion (23) of relatively small radius, said turning shafts (17) being so spaced from the respective one of said engaging sections (19), that in one rotated position of said push rod-connecting member (7) said abutting portions (22) are brought to positions opposed to said engaging sections (19) for locking said push rod-connecting member (7) against folding, and so that in another rotated position of said push rod-connecting member said clearing portions (23)

are brought to positions opposed to said engaging sections (19), whereby said clearing portions (23) clear said engaging sections for folding said push rod-connecting member (7) around the axes of said turning shafts (17).

2. The connecting structure as set forth in claim 1, wherein said push rod-connecting member (7) is foldable in but one direction.

3. The connecting structure as set forth in claim 1, wherein said bracket (16) has a U-shaped cross-section, whereby said bracket serves as a cover for the respective one of said sockets (18), said U-shaped cross-section having a closed bottom opposite an open side, said closed bottom limiting the folding of said push rod-connecting member (7) to but one direction toward said open side.

4. The connecting structure as set forth in claim 1, including turning range limiting means (25, 26, 27), whereby the turning of said push rod-connecting member (7) received in said sockets (18) around its longitudinal axis is limited to a predetermined angular range.

5. The connecting structure as set forth in claim 4, wherein said turning range limiting means (25, 26, 27) comprises a pair of rising walls (25, 26) formed in the boundary between said abutting portion (22) and clearing portion (23) of said lock control section (20), and a projecting portion (27) formed on said socket (18) opposed to said clearing portions (23) and positioned between said rising walls (25, 26).

6. The connecting structure as set forth in claim 1, wherein said engaging sections (19) are integral with said sockets (18).

7. The connecting structure as set forth in claim 1, wherein in order to make said push rod-connecting member (7) foldable, said push rod-connecting member (7) is divided into at least two portions (11, 12) along its length, said structure further comprising pin means (13) for foldably interconnecting said portions (11, 12) so that said portions (11, 12) are foldable around the axis of the respective one of said connecting pin means (13).

8. The connecting structure as set forth in claim 7, wherein in the state in which folding of said push rod-connecting member (7) around the axis of said turning shaft (17) is permitted, the axis of said connecting pin means (13) extends in parallel to the axis of said turning shaft (17).

9. The connecting structure as set forth in claim 8, wherein in the state in which folding of said push rod-connecting member (7) around the axis of said turning shaft (17) is inhibited, the axis of said connecting pin means (13) crosses at right angles a line parallel to the axis of said turning shaft (17).

* * * * *